United States Patent

Hulsing, II

[11] Patent Number: 5,866,816
[45] Date of Patent: Feb. 2, 1999

[54] ANGULAR RATE SENSOR MISALIGNMENT CORRECTION

[75] Inventor: Rand H. Hulsing, II, Redmond, Wash.

[73] Assignee: AlliedSignal Inc., Morristown, N.J.

[21] Appl. No.: 969,968

[22] Filed: Nov. 13, 1997

Related U.S. Application Data

[63] Continuation of Ser. No. 708,003, Aug. 23, 1996, abandoned, which is a continuation of Ser. No. 452,363, May 30, 1995, abandoned.

[51] Int. Cl.⁶ .............................. G01C 19/00; G01P 3/44; G01P 9/00; G01P 15/14
[52] U.S. Cl. ....................................... 73/504.16
[58] Field of Search ............................ 73/504.12, 504.14, 73/504.15, 504.16; 310/314, 315, 316, 317, 318

[56] References Cited

U.S. PATENT DOCUMENTS

| | | | |
|---|---|---|---|
| 3,842,681 | 10/1974 | Mumme | 73/504.15 |
| 3,893,915 | 7/1975 | Schlitt | 73/504.16 |
| 3,946,257 | 3/1976 | Kawamura | 310/9.6 |
| 4,372,173 | 2/1983 | EerNisse et al. | 73/862.54 |
| 4,415,827 | 11/1983 | Chuang | 310/370 |
| 4,469,979 | 9/1984 | Chuang | 310/370 |
| 4,510,802 | 4/1985 | Peters | 73/505 |
| 4,590,801 | 5/1986 | Merhav | 73/510 |
| 4,654,663 | 3/1987 | Alsenz et al. | 340/870.3 |
| 4,665,748 | 5/1987 | Peters | 73/505 |
| 4,724,351 | 2/1988 | EerNisse et al. | 310/328 |
| 4,799,385 | 1/1989 | Hulsing et al. | 73/505 |
| 4,802,364 | 2/1989 | Cage et al. | 73/505 |
| 4,899,587 | 2/1990 | Staudte | 73/505 |
| 4,912,990 | 4/1990 | Norling | 73/862.59 |
| 5,113,698 | 5/1992 | Grlj et al. | 73/862.59 |
| 5,193,391 | 3/1993 | Cage | 73/505 |
| 5,275,055 | 1/1994 | Zook et al. | 73/778 |
| 5,285,127 | 2/1994 | Egley et al. | 310/366 |
| 5,331,242 | 7/1994 | Petri | 310/370 |
| 5,367,217 | 11/1994 | Norling | 310/370 |
| 5,396,797 | 3/1995 | Hulsing, II | 73/505 |

FOREIGN PATENT DOCUMENTS

| | | | |
|---|---|---|---|
| 0 161 049 A1 | 11/1985 | European Pat. Off. | G01P 9/04 |
| 0 298 651 A2 | 1/1989 | European Pat. Off. | G01P 9/04 |
| 0 494 588 A1 | 7/1992 | European Pat. Off. | G01C 19/56 |
| 4041582 | 6/1992 | Germany | 73/504.12 |

*Primary Examiner*—Hezron Williams
*Assistant Examiner*—Richard A. Moller

[57] ABSTRACT

An angular rate sensor includes a plurality of spaced apart vibrating beams, for example, four beams, defining a pair of outer beams and a pair of inner beams. Each outer beam is mechanically coupled to an inner beam by way of an interconnecting member. The outer beams are excited to cause them to vibrate in the plane of the beams and 180 degrees out of phase with the inner beams. In order to compensate for bias errors due to geometric mismatches between the beams, electrode patterns are deposited on the beams up to the point of inflection of the beam during vibration. The electrodes enable an electric field to be applied either parallel or normal to the longitudinal axis of the drive beams, which, in turn, cause the beams to twist about their longitudinal axis. Such twisting forces the quadrature acceleration components to cancel and thus electrically compensates for such bias errors due to quadrature acceleration components.

22 Claims, 9 Drawing Sheets

ANGULAR RATE SENSOR MISALIGNMENT CORRECTION

CROSS-REFERENCE TO RELATED APPLICATION

This application is a continuation of Ser. No. 08/708,003 filed on Aug. 23, 1996 which is a continuation of Ser. No. 08/452,363 filed on May 30, 1995, both abandoned, and claims priority therefrom.

This patent application is related to co-pending applications Ser. No. 08/453,118, entitled "Angular Rate Sensor Electronic Balance", filed on even date, and Ser. No. 08/453,026, entitled "Non-Gimballed Angular Rate Sensor System", filed on even date. Other co-pending applications relating to angular rate sensors, assigned to the same assignee as the instant application are as follows: "Micromachined Rate and Acceleration Sensor" Ser. No. 07/653,533, filed on Feb. 8, 1991 now U.S. Pat. No. 5,241,861; and "Micromachined Rate and Accelerator Sensor", Ser. No. 07/823,102, filed on Jan. 21, 1992 now U.S. Pat. No. 5,331,853.

BACKGROUND OF THE INVENTION

1. Field of the Invention

The present invention relates to an angular rate sensor and more particularly to an angular rate sensor which includes a plurality of vibrating beams. The sensor includes electrical compensation for bias errors due to differences in the beam geometry, thus obviating the relatively labor-intensive mass balancing compensation method of the beams currently used in the art.

2. Description of the Prior Art

Angular rate sensors are generally known in the art. Examples of such sensors are discussed in detail in U.S. Pat. Nos. 4,510,802; 4,590,801; 4,654,663; 4,665,748; 4,799,385; and 5,396,797. Such sensors are used to provide a signal representative of the rate of change of angular motion relative to the longitudinal axis of the sensor for use in navigational and inertial guidance systems.

In a known implementation of an angular rate sensor, for example, as disclosed in the '663 patent, a plurality of vibrating beams are mounted to the structure whose angular rate is to be sensed by way of a gimballed mounting structure. The vibrating beams are typically made from a flat sheet or web of a crystalline material, often piezoelectric quartz. The beams are configured in a spaced-apart, parallel relationship and are excited to vibrate at their resonant frequency in the plane of the web, 180 degrees out of phase with one another. Angular motion about an axis parallel to the longitudinal axis of the beams causes a force generally perpendicular to the plane of the vibrating beams, known as a Coriolis force. The Coriolis force amplitude modulates the vibrating frequency of the beams, which, in turn, provides a measure of the Coriolis force and hence the angular rate of motion relative to the longitudinal axis of the sensor.

Unfortunately, small differences in the beam geometry can result in bias errors in the sensor output. Such bias errors are discussed in detail in the '385 patent, hereby incorporated by reference. More particularly, quadrature acceleration components resulting from acceleration of the beams during excitation are normally equal and thus cancel out since the beams are 180 degrees out of phase with one another. However, when the beams are not perfectly matched, the quadrature acceleration components of the beams may vary in magnitude and phase relative to one another and thus may not cancel out. The quadrature acceleration components are normally orders of magnitude larger than the angular rate signal. As such, the quadrature acceleration components can result in significant bias errors in the angular rate signal.

Typically, such bias errors are compensated by mass balancing of the beams. More particularly, gold is normally added to both vibrating beams and selectively removed by way of a laser until the biasing errors are either minimized or eliminated. Unfortunately, the process is relatively labor intensive and requires the balancing to be done by trial and error techniques.

One attempt to solve the problem of mass balancing of vibrating beams is disclosed in U.S. Pat. No. 5,113,698. In that system, a drive signal is provided to each beam to cause the beams to vibrate at a frequency that is relatively close to the isolated resonant frequencies of one of the beams in order to improve the mechanical Q of the sensor. However, the mechanical Q of an angular rate sensor is generally of little significance. More importantly for an angular rate sensor is that the quadrature acceleration components cancel.

SUMMARY OF THE INVENTION

It is an object of the present invention to solve various problems associated with the prior art.

It is yet another object of the present invention to provide an angular rate sensor which compensates for geometric mismatches of the beams while obviating the need to mass balance the beams.

It is yet another object of the present invention to provide an angular rate sensor in which the quadrature acceleration components on the beams are forced to cancel.

Briefly, the present invention relates to an angular rate sensor which includes a plurality of spaced apart vibrating beams, for example, four beams, defining a pair of outer beams and a pair of inner beams. Each outer beam is mechanically coupled to an inner beam by way of an interconnecting member. The outer beams are excited to cause them to vibrate in the plane of the beams and 180 degrees out of phase with the inner beams. In order to compensate for geometric mismatches between the beams, electrode patterns are deposited on the beams up to the point of inflection of the beam during vibration. The electrodes enable an electric field to be applied either parallel or normal to the longitudinal axis of the drive beams, which, in turn, causes the beams to twist about their longitudinal axis. Such twisting forces the quadrature acceleration components to cancel and thus electrically compensates for the bias errors due to quadrature acceleration components.

BRIEF DESCRIPTION OF THE DRAWING

These and other objects of the present invention will be readily understood with reference to the following description and attached drawing, wherein.

DETAILED DESCRIPTION OF THE INVENTION

Figure 1:
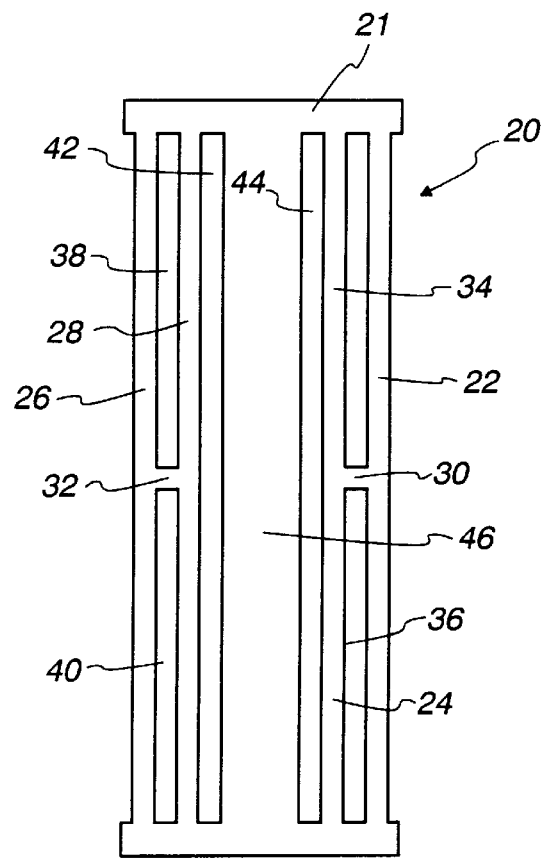
FIG. 1 is a plan view of the angular rate sensor in accordance with the present invention.

An angular rate sensor, generally identified with the reference numeral 20, is illustrated in FIG. 1. The angular rate sensor 20 is described and illustrated as being formed from a crystalline material, such as quartz. However, the present invention also contemplates the use of other piezoelectric materials, such as piezoelectric ceramics, such as barium titinate or lead zirconate-lead titinate. In addition, other materials are also contemplated, such as various silicone materials, such as polycrystalline silicon, silicon dioxide, silicon nitrite and other materials as described in detail in commonly assigned U.S. Pat. No. 5,376,217, hereby incorporated by reference.

SENSOR CONSTRUCTION

The angular rate sensor 20 is formed from a generally planar substrate 21 with a plurality of vibrating beams 22, 24, 26 and 28 defining an outer pair of vibrating beams 22 and 26 and an inner pair of vibrating beams 24 and 28. The outer beams 22 and 26 are mechanically coupled to the inner beams 24 and 28 by way of interconnecting members 30 and 32, respectively. The interconnecting members 30 and 32 are formed generally at the midpoint of the outer beams 22, 26 and inner beams 24, 28. The beams 22, 24, 26 and 28, as well as the interconnecting members 30 and 32, are formed by forming slots 34 and 36 between the beams 22 and 24 and by forming slots 38 and 40 between the beams 26 and 28. A pair of slots 42 and 44 is disposed lengthwise adjacent to the inner beams 24 and 28. A center mounting section 46 is formed between the slots 42 and 44. The slots 34, 36, 38, 40, 42 and 44 form the beams 22, 24, 26 and 28, which are joined together on opposing ends. The method for forming the slots 34, 36, 38, 40, 42 and 44 is described in detail in U.S. Pat. No. 5,367,217; hereby incorporated by reference.

Since the inner beams 24, 28 are mechanically coupled to the outer beams 22 and 26 by way of the interconnecting members 30 and 32, only the outer beams 22 and 26 are excited. As will be discussed in more detail below, electrodes are formed on the beams 22, 24, 26 and 28 are excited such that all of the beams 22, 24, 26 and 28 vibrate laterally in the plane of the substrate 21 in a direction generally perpendicular to the longitudinal axis of the beams; 180 degrees out of phase. When the sensor 20 experiences an angular motion about an axis generally parallel to the longitudinal axis of the beams 22, 24, 26 and 28, forces are generated on the beams 22, 24, 26 and 28 in a direction generally normal or perpendicular to the plane of the substrate 21. These forces, as discussed above, generally known as Coriolis forces, will provide an indication of the angular rate about an axis generally parallel to the longitudinal axis of the sensor 20.

ELECTRODE PATTERN

Figure 3:
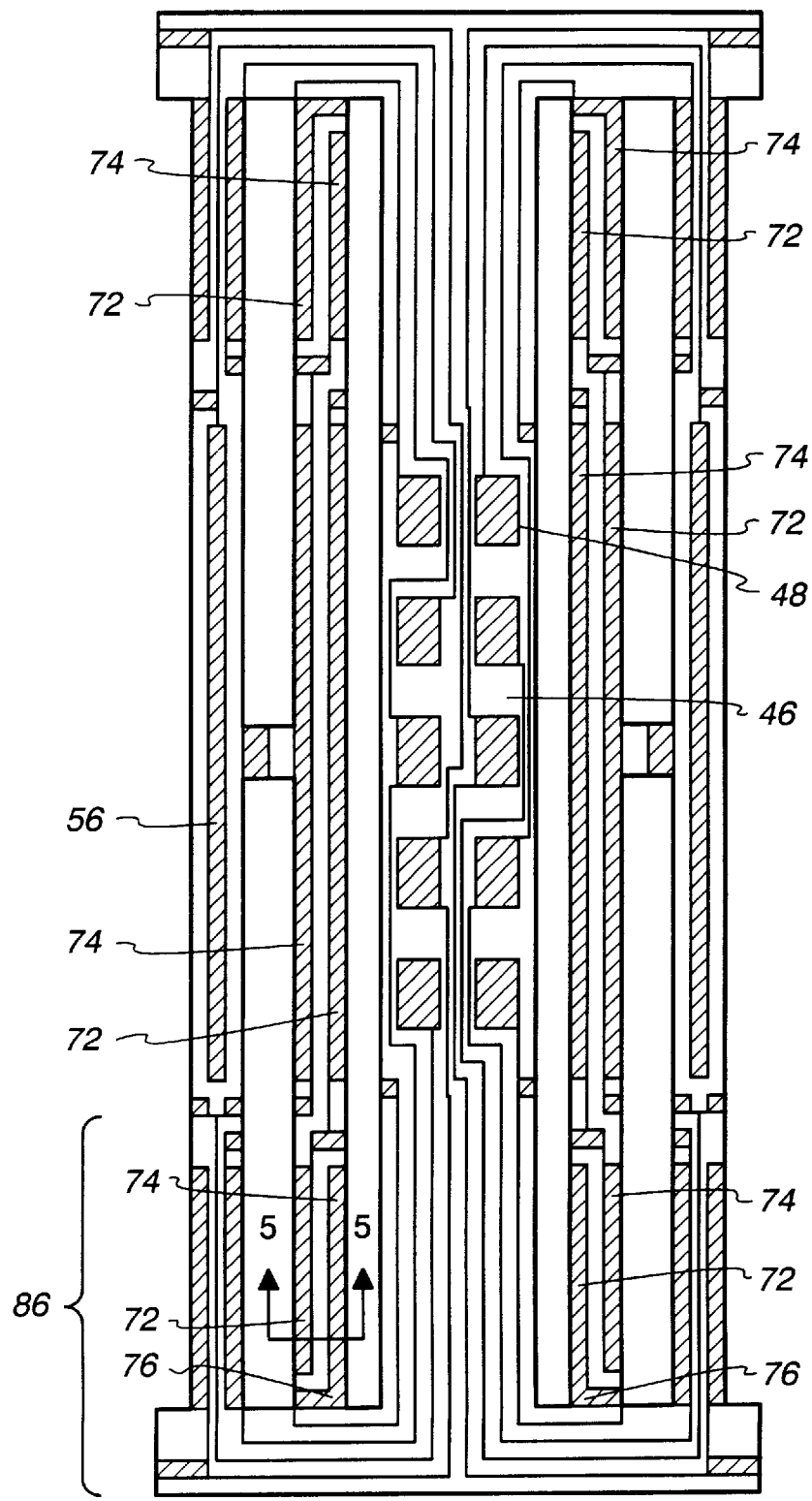
FIG. 3 is a top plan view of the sensor illustrated in FIG. 2 illustrating the electrode pattern.
Figure 4:
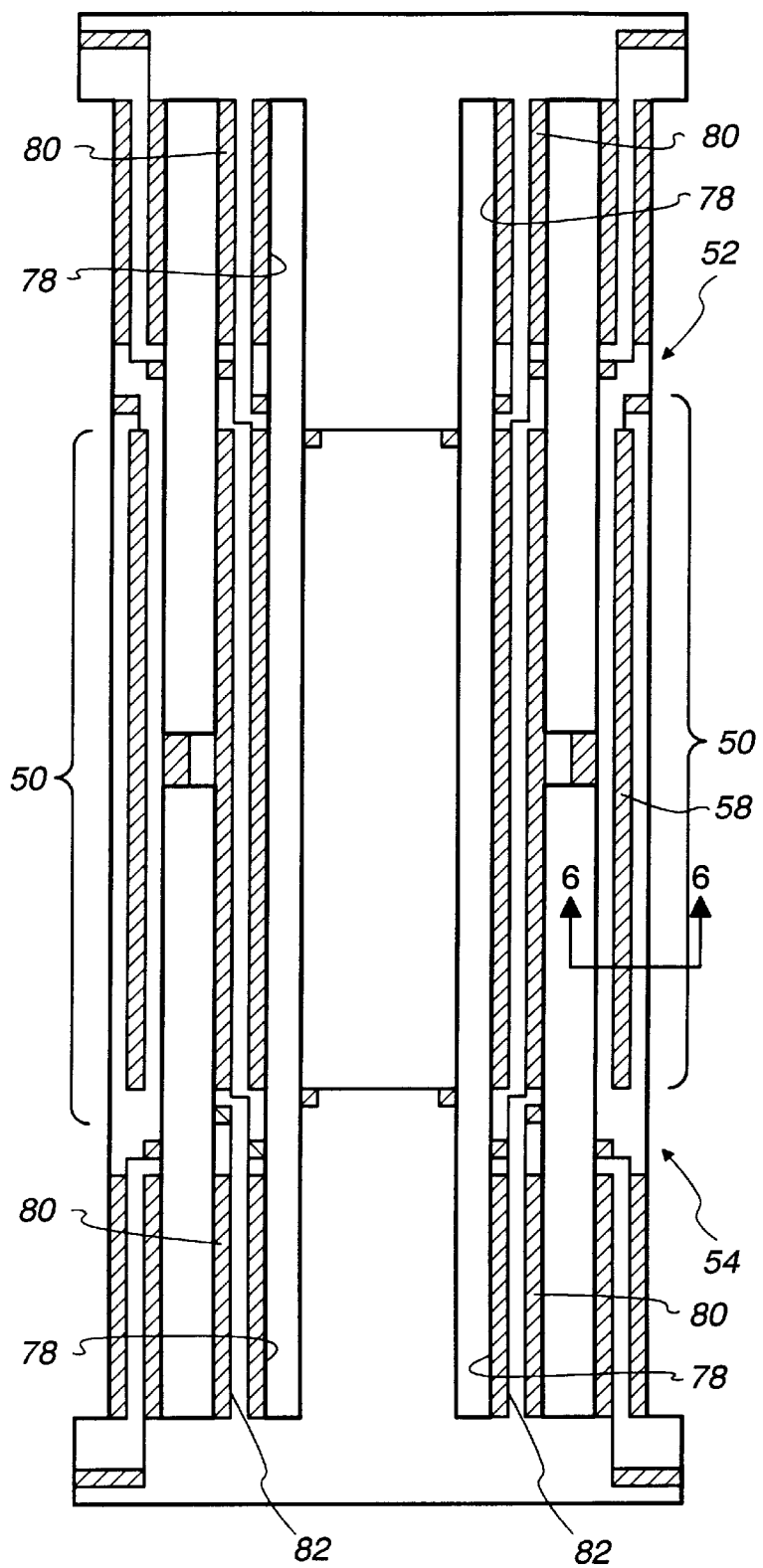
FIG. 4 is a bottom plan view similar to FIG. 3, illustrating the electrode pattern.
Figure 5:
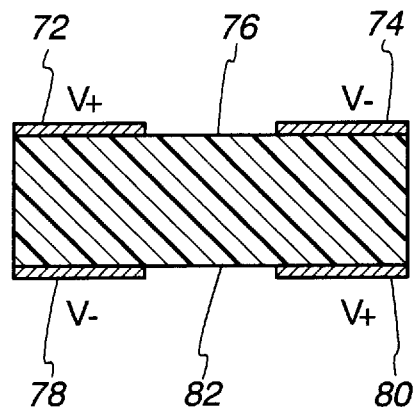
FIG. 5 is a sectional view of a drive beam illustrating the electrode configuration for compensating for beam mismatches in accordance with the present invention.

The electrode pattern for the angular rate sensor 20 in accordance with the present invention is illustrated in FIGS. 3–8. As illustrated, a plurality of electrode pads 48, for example 10, are disposed in the center portion 46 of the substrate 21. These electrode pads 48 enable the sensor 20 to be connected to an external electrical circuit as discussed below, used for driving the outer vibrating beams 22 and 26 as illustrated in more detail in FIG. 6 and for sensing the motion of the inner vibrating beams 24 and 28 as illustrated in FIG. 5. In addition, the electrode pattern illustrated in FIG. 5 is also used to provide electrical compensation for geometric mismatches of the vibrating beams 22, 24, 26 and 28 as discussed above. A detailed description of the method of forming such electrodes and electrode pads 48 on various types of substrates is disclosed in U.S. Pat. No. 5,376,217, incorporated by reference.

Figure 6:
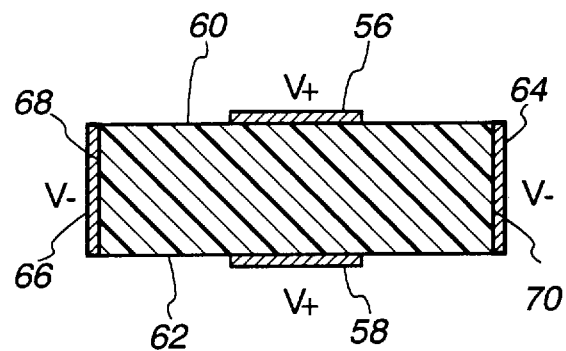
FIG. 6 is a sectional view of a single beam illustrating the electrode pattern for excitation.
Figure 14:
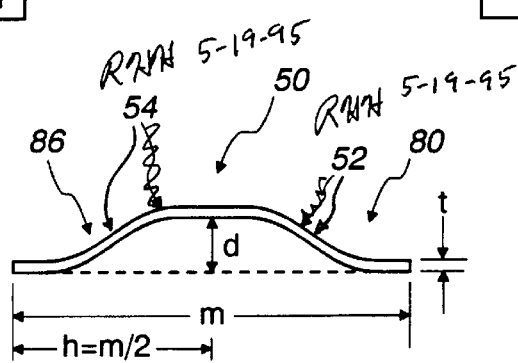
FIG. 14 is an exaggerated elevational view of a vibrating beam clamped on both ends, shown in an excited state.

Referring first to FIGS. 3, 4 and 6, the electrode pattern for providing excitation to the beams 22, 24, 26 and 28 is illustrated. Since the inner vibrating beams 24 and 28 are interconnected to the outer vibrating beams 22 and 26 by way of the interconnecting members 30 and 32, respectively, it is only necessary to drive or excite the outer vibrating beams 22 and 26. In accordance with the present invention, only a center portion of the outer vibrating beams 22 and 26, shown bracketed and identified with the reference numeral 50, is excited. As discussed in more detail in the Appendix and illustrated in FIG. 14, the center portion 50 is that section between nodes or points of inflection 52 and 54 on the outer vibrating beams 22 and 26 in an excited state. More particularly, as clearly shown in FIG. 6, first and second electrodes 56 and 58 are disposed on a top side 60 and a bottom side 62 of the center portion 50 of the outer vibrating beams 22 and 26. Additionally, a pair of electrodes 64 and 66 are disposed along opposing edges 68 and 70 along the center portion 50 of the outer vibrating beams 22 and 26. The electrodes 56, 58, 64 and 66 are electrically interconnected to the electrode pads 48 in the center section 46 of the sensor 20 and connected to the drive circuit illustrated in FIG. 12 and discussed below.

In order to cause vibration of the vibrating beams 22, 24, 26 and 28 in the plane of the substrate 21 but 180 degrees out of phase, a positive voltage potential is applied to the electrode 56 and 58, while a negative potential is applied to the electrodes 64 and 66. Positive and negative potentials are applied by way of the electrode pads 48 and intermediate electrode patterns, which interconnect the electrode pads 48 with the electrodes 56, 58, 64 and 66.

The electrode pattern for sensing vibration of the inner vibrating beams 24 and 28 is illustrated best in FIG. 5. As shown, two electrodes 72 and 74 are formed on a top surface 76 of the inner vibrating beams 24 and 28. A pair of electrodes 78 and 80 is formed along a bottom surface 82 of the inner vibrating beams 24 and 28. The electrodes 72, 74, 78 and 80 are electrically interconnected with electrode pads 46.

As shown in FIGS. 3 and 4, the polarities of the electrodes 72, 74, 78 and 80 is reversed at each of the nodal points 52 and 54 along the inner vibrating beams 24 and 28. With such a configuration, the motion of the entire length of the inner vibrating beams 24 and 28 is sensed, which significantly increases the amplitude of the sensing signal. The electrodes 72, 74, 78 and 80 are electrically connected back to the electrode pads 48 in the center section 46 of the substrate 21 by way of an interconnecting electrode pattern, shown in FIGS. 3 and 4.

SENSOR MISALIGNMENT CORRECTION

As mentioned above, the vibrating beams 22, 24, 26 and 28 may not be perfectly mass-balanced at the completion of the manufacturing process of the angular rate sensor 20, which, as discussed above, can cause biasing errors due to coupling of the quadrature acceleration component in the output of the sensor 20. Heretofore, the vibrating beams have been mass balanced by depositing gold, for example, thereupon and selectively removing the gold by trial and error until the biasing errors are either minimized or eliminated. As discussed above, such a method is relatively labor-intensive and thus drives up the cost of such sensors.

The sensor 20 in accordance with the present invention obviates the need to utilize such cumbersome techniques for mass balancing the vibrating beams 22, 24, 26 and 28. More particularly, in accordance with the present invention, the geometric mismatches of the vibrating beams 22, 24, 26 and 28 are compensated for by forcing the vibrating beams 22, 24, 26 and 28 to bend about their longitudinal axis. More specifically, portions of the beams 22, 24, 26 and 28, identified with the reference numeral 86 (FIG. 3), which extend from opposite ends of the vibrating beams 22, 24, 26 and 28 to the nodal points 52 and 54, are provided with electrode patterns, as will be discussed below, to enable the beams 22, 24, 26 and 28 to be excited to cause the beams 22, 24, 26 and 28 to bend relative to their longitudinal axis.

One such pattern is illustrated in FIG. 5. As mentioned above, the electrode pattern illustrated in FIG. 5 also enables the motion of the inner vibrating beams 24 and 28 to be sensed along their entire length. By applying a positive and negative potentials to any combination of the electrodes 72, 74, 78 and 80 and/or to the portions 86 of preferably the outer vibrating beams 22 and 26, the beams 22, 24, 26 and 28 can be bent to compensate for geometric mismatches of the beams 22, 24, 26 and 28. More particularly, since the inner beams 24 and 28 are interconnected to the drive beams 22 and 26 by way of the interconnecting members 30 and 32, the electric field developed by applying positive and negative voltage potentials as discussed above causes the inner beams 24 and 28 to bow out of the plane of the substrate 21, which, in turn, induces a twist in the outer or drive beams 22 and 26. As mentioned above, the bending of the beams compensates-for geometric mismatches of the beams.

Alternative circuits for electrically compensating for the geometric mismatch of the vibrating beams 22, 24, 26 and 28 are illustrated in FIGS. 7–10. The electrode patterns illustrated in FIGS. 7–10 are disposed along sections 86 of the vibrating beams 22, 24, 26 and 28. In particular, the electrode patterns as illustrated in FIGS. 7–10 are disposed from the clamped ends of the beams 22, 24, 26 and 28 up to the point of inflection of the beams 22, 24, 26 and 28 (i.e. nodal points 52 and 54). The point of inflection of the beams 22, 24, 26 and 28 is discussed in the Appendix and occurs at about 22% of the length of the beam from one end.

Figure 7:
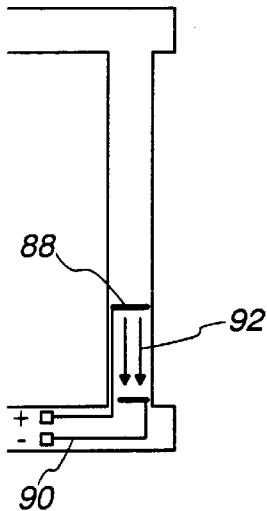
FIG. 7 is an exaggerating top plan view of the electrode pattern illustrated in FIG. 5.
Figure 8:
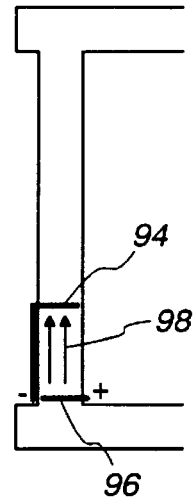
FIG. 8 is a bottom plan view, similar to FIG. 7.

FIGS. 7 and 8 relate to a first alternate embodiment in which an electric field of opposite polarities is induced on opposing sides (i.e. top and bottom) of the vibrating beams 22, 24, 26 and 28. In particular, FIG. 7 illustrates the electrode pattern for one side of the vibrating beams 22, 24, 26 and 28, while FIG. 8 illustrates the electrode pattern for an opposing side of the vibrating beams 22, 24, 26 and 28. As shown in FIG. 7, spaced-apart electrodes 88 and 90 are disposed adjacent one end of each of the vibrating beams 22, 24, 26 and 28. Positive and negative DC potentials are applied to the electrodes 88 and 90 to cause an electric field having a polarity as indicated by the arrows 92 at one end of each of the vibrating beams 22, 24, 26 and 28.

In order to cause the beams to bend about the beams 22, 24, 26 and 28, about their longitudinal axis, a pair of spaced-apart electrodes 94 and 96 are formed on the opposite side of each of the beams 22, 24, 26 and 28. Positive and negative DC potentials are applied to the electrodes 94 and 96 to cause an electric field having an opposite polarity as indicated by the arrows 98.

In accordance with the present invention, the electrodes 88, 90, 94 and 96 are disposed on opposing sides of, for example, the outer vibrating beams 22 and 26, and disposed within the portion 86 between one end of the vibrating beams 22 and 26 and one of the nodal points 52 and 54. As discussed above, a DC potential applied to electrodes used for sensing, configured as illustrated in FIG. 5, causes bending of the inner vibrating beams 24 and 28 as discussed above. The sections 86 of the outer vibrating beams 22 and 26 are configured with the electrode patterns as illustrated in FIGS. 7 and 8 to cause twisting of the outer vibrating beams 22 and 28. Alternatively, the electrode pattern illustrated in FIGS. 7 and 8 can be used on all four vibrating beams 22, 24, 26 and 28 for electrically compensating for biasing errors. However, in the latter embodiment, the configuration of the electrodes would not enable the entire length of the inner vibrating beams 24 and 28 to be sensed.

Figure 9:
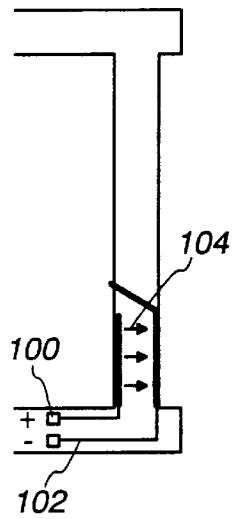
FIG. 9 is similar to FIG. 7 but illustrating an alternative embodiment of the electrode pattern.
Figure 10:
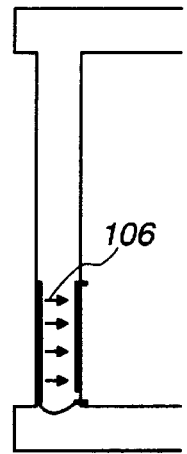
FIG. 10 is similar to FIG. 8 but illustrating an alternative embodiment of the electrode pattern.

Another alternate embodiment of the electrode pattern for compensating for geometric mismatch of the vibrating beams 22, 24, 26 and 28 is illustrated in FIGS. 9 and 10. In this embodiment the electrodes are configured to cause the inner electrodes 24 and 28 to bow out of the plane of the substrate. Similar to the embodiment illustrated in FIG. 5, the bowing of the inner vibrating beams 24 and 28 causes the outer drive beams 22 and 26 to twist since the inner vibrating beams 24 and 28 are interconnected to the outer beams 22 and 26 by way of the interconnecting members 30 and 32. In this embodiment, electrode patterns 100 and 102 are disposed on a top surface of the inner vibrating beams 24 and 28. The electrode pattern is wrapped around the inner beams 24 and 28 to form the configuration illustrated in FIG. 10. By applying a positive potential to the electrode 100 and a negative DC potential to the electrode 102, an electric field is induced, having a polarity as indicated by the arrows 104 on the top side of the inner beams 24 and 28. By way of the wrap around of the electrodes 100 and 102, a electric field of opposite polarity, represented by the arrows identified by the reference numeral 106 is generated on the opposite or opposing or bottom surface of the inner beams 24 and 28. These opposite polarities cause the inner beams 24 and 28 to bow out of the plane of the substrate 21 and, in turn, cause the bending of the outer drive beams 22 and 26 as discussed above. These patterns could also be applied to section 86 of the drive beams 22 and 26 to cause the same effect, leaving the entire sensing pattern of the beams 24 and 28 intact.

ELECTRONIC BALANCE

Figure 12:
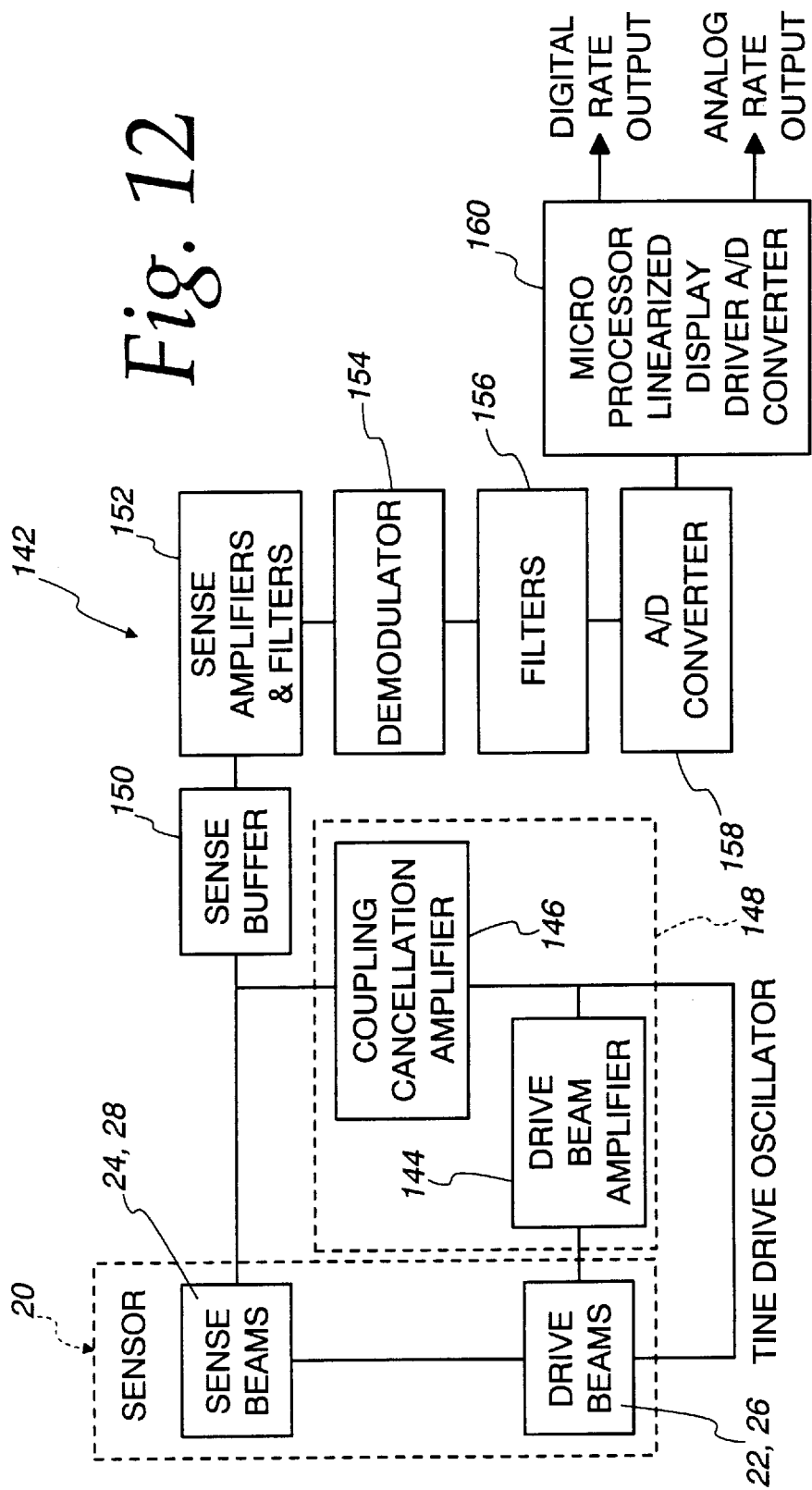
FIG. 12 is a block diagram of a beam drive and sensing circuit for use with the angular rate sensor in accordance with the present invention.

In angular rate sensors, if the beams are unbalanced, the acceleration of the beams due to excitation can result in differences in the phase and magnitude of the quadrature acceleration signals as discussed above. In such a situation, the Coriolis signal, which, as mentioned above, amplitude modulates the output signal from each of the beams, has to be demodulated from each of the beams separately to minimize errors due to magnitude and phase differences of the quadratic acceleration signals. The electronic balance in accordance with the present invention enables electronic balancing, which forces the quadrature acceleration signals to cancel when geometric mismatches exist such that a single demodulator can be used for the Coriolis signal as illustrated in FIG. 12.

Figure 11:
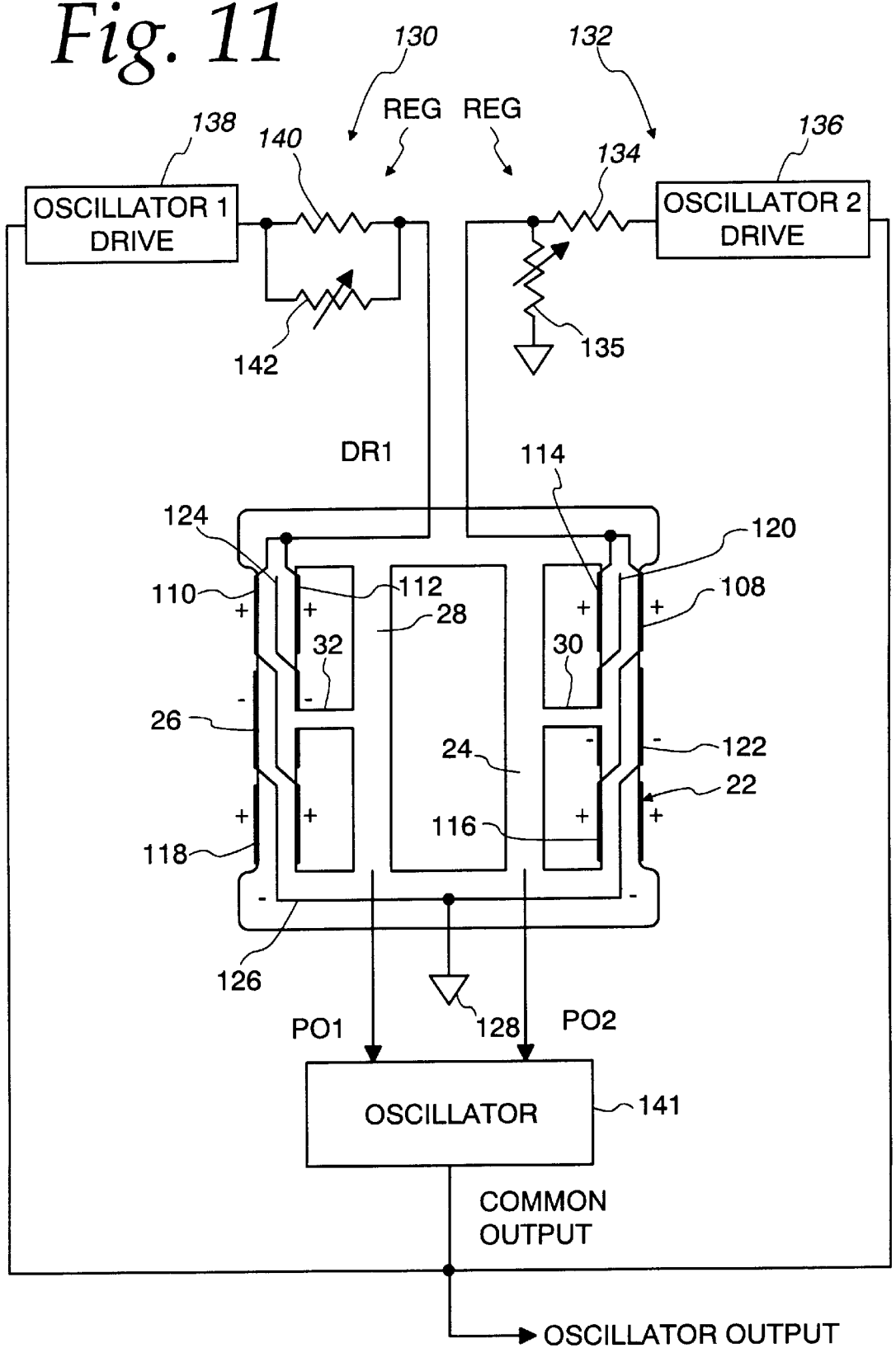
FIG. 11 is a diagram of an electronic balance for compensating for beam mismatches in accordance with the present invention.

An electronic balance for compensating for mismatches in the beams 22, 24, 26 and 28 is illustrated in FIG. 11. The electronic balance can be used alternatively or in conjunction with the methods illustrated in FIGS. 5 and 7–10. In this embodiment, the invention takes advantage of the fact that the natural frequency of the beam changes as a function of the drive amplitude as discussed below. The natural frequency changes due to the non-linear increase in the inherent stiffness of the beam material due to increasing tension as the beam deflects at higher displacements as set forth in equation (1) below.

$$freq = fo \sqrt{1 + 2.14 * d^2/t^2} \quad ; \qquad (1)$$

where d is the displacement of the beam and t is the thickness of the beam in the direction of vibration.

Test data on beams clamped on both ends at about a 3% displacement shows that the initial natural frequency increases by about 0.1%. Thus, if the lower frequency beam of the pair is driven at a larger amplitude, the frequency of the beams can be adjusted to match.

Normally both drive beams (i.e. outer beams 22 and 26) are electrically connected to the same electric potentials but opposite polarities to drive the beams in opposite directions. In accordance with the present invention, the drive beams 22 and 26 are driven separately to enable different drive amplitudes to be applied to each of the beams 22 and 26. By applying different drive amplitudes to each of the beams 22 and 26, the output signals of the beams can be matched as discussed above.

FIG. 11 illustrates a circuit for electronically balancing quadrature acceleration signals of the angular rate sensor 20 in accordance with another aspect of the present invention. In particular, an electrode pattern is disposed on outer drive beams 22 and 26 as generally illustrated in FIG. 6. However, the external connections to the electro-depatterns are separated to enable different drive amplitudes to be applied to the beams 22 and 26. In particular, positive electrodes 108–118 are formed along the edges and a surface of the beams 22 and 26 as illustrated in FIG. 11. Similarly, negative electrodes 120–126 are also formed on the edges and surface of the drive beams 22 and 26 as shown. These negative electrodes 120–126 are connected together at one end and, in turn, to a common ground 128. The other ends of the electrodes 64 and 66 are connected to the electrode pads 48 (FIG. 3) and, in turn, to a source of negative DC potential. The positive electrodes 110 and 112 are connected together and to a first drive circuit, generally identified with the reference numeral 130. Similarly, the positive electrodes 108 and 114 are connected together and, in turn, to a second drive circuit, generally identified with the reference numeral 132. By providing a separate drive circuit for each of the drive beams 22 and 26, the drive amplitudes to the beams 22 and 26 can be varied, which as discussed above, varies the vibrating frequency of the beams. This enables any mismatch of the beam frequencies resulting from geometric mismatches of the beams, which can prevent the quadrature acceleration components from cancelling out, to be compensated for electronically.

As mentioned above, the natural frequency of the beams can be varied by varying the drive amplitudes to the beams while maintaining the equivalence of the source resistance of the drive circuits to the beams 22 and 26. Thus, a voltage divider circuit consisting of a pair of resistors 134 and 135, for example, can be connected to the beam having the higher natural frequency, for example, the beam 22, and to a first oscillator drive circuit 136. The lower frequency beam, for example, the beam 26, can be connected to a second oscillator drive circuit 138 by way of a resistance that is equivalent to the total source resistance of oscillator drive circuit 136, for example, parallel resistors 140 and 142. The resistors 135 and 142 may be variable resistors of the same nominal value, for example 20 ohms, while the resistors 134 and 140 are also selected to have the same nominal value, for example 10 ohms.

Such a configuration enables the drive amplitudes to the drive beams 22 and 26 to be varied. By varying the drive amplitudes to the drive beams 22 and 26, the vibrating frequencies can be forced to be the same, forcing the quadrature acceleration components to cancel as discussed above.

As illustrated in FIG. 11, the inner beams 24 and 28 are used as the sensing beams. As such, these beams 24 and 28 are connected to an oscillator circuit 141, commonly known in the art, whose output electrical frequency will vary as a function of the vibrating frequency of the sense beams 24 and 28.

DRIVE AND SENSE CIRCUITS

The drive and sense circuit is shown in FIG. 12 and generally identified with the reference numeral 142. Essentially, the drive and sense circuit 142 is adapted to provide drive signals as discussed above to provide excitation to the beams 22 and 26 and also provide sensing of the inner pair of vibrating beams 24 and 28. The drive beams 24 and 28 are coupled to a drive amplifier 144 and a coupling cancellation amplifier 146 which form a drive circuit 148. Essentially, the drive circuit 148 is known in the art and includes the drive amplifier 144 which, for example, may be an operational amplifier with automatic gain control. The output of the drive amplifier 144 is coupled to a coupling cancellation amplifier 146. The coupling cancellation amplifier 146 prevents the drive signal from being sensed by the sensing circuit to be described above. As is known in the art, the signal to be sensed is capacitively coupled to the drive signals. Thus, the coupling cancellation amplifier 146 is used to invert the signal from the drive amplifier 144 and capacitively couple it to the sensing circuit to cancel the drive signal from the sensing circuit. The output of the coupling cancellation amplifier 146 is electrically coupled to a sense buffer 150. The sense buffer 150 generally converts charge signal from the sensing beams 24 and 28 to a voltage, which, in turn, is amplified by sense amplifier and filter circuit 152. The rate signal is then picked off by way of a demodulator 154. As is known by those of ordinary skill in the art, the rate signal essentially amplitude modulates the signal of the sensing beams 24 and 28. The demodulator, for example, a synchronous demodulator, demodulates the signal from the inner beams 24 and 28 to obtain the angular rate signal. The rate signal, in turn, is filtered by a filtering circuit 156 and converted to a digital value by way of an analog-to-digital converter 158. The output of the analog-to-digital converter 158 can, in turn, be applied to a microprocessor linear display driver 160 with either an on board digital/analog converter or be used with a separate D to A converter to provide both digital rate signals and analog rate signals.

NON-GIMBALLED MOUNTING

Gimballed mounting structures for angular rate sensors are generally known in the art. An example of such a gimballed angular rate sensor is disclosed in U.S. Pat. No. 4,654,663. Gimballed mounting structures for angular rate sensors have certain inherent disadvantages. For example, the bandwidth of the sensor becomes narrower as the frequency separation between the drive and sense mode decreases in order to achieve increased sensitivity. Moreover, fabrication difficulties are often experienced in achieving the proper separation of the drive and sense modes while the optimization of the signal strength is also limited by the same design considerations.

Figure 13:
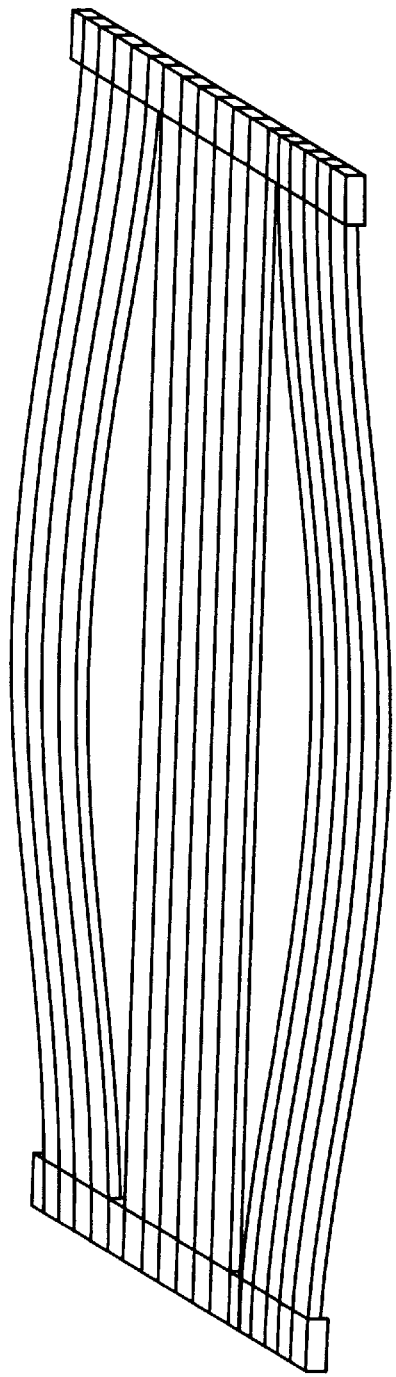
FIG. 13 is a finite element analysis plot of the angular rate sensor in accordance with the present invention.
Figure 15:
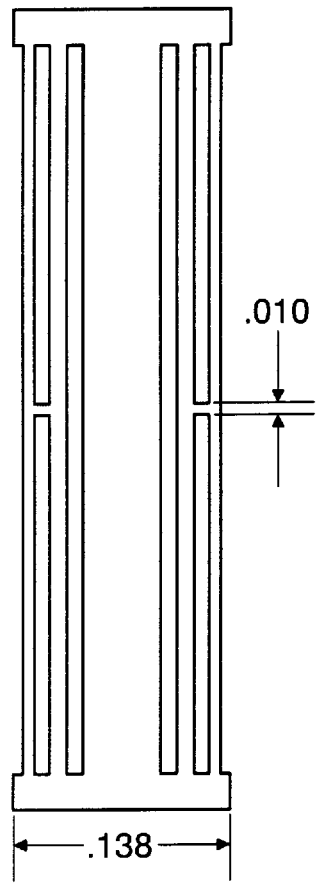
FIGS. 15 and 16 are similar to FIG. 1 and illustrate exemplary dimensions of the angular rate sensor in accordance with the present invention.
Figure 16:
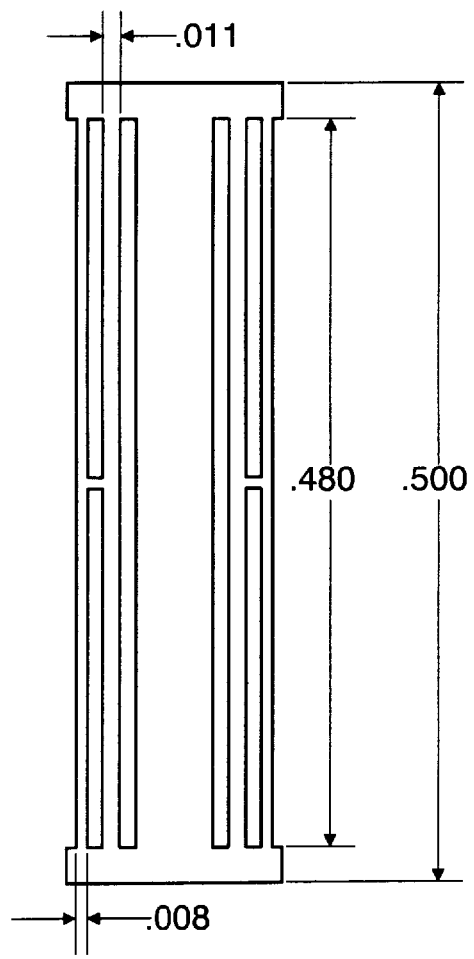

The non-gimballed angular rate sensor in accordance with the present invention solves the problems discussed above. Exemplary dimensions of the non-gimballed angular rate sensor are illustrated in FIGS. 15 and 16. For the dimensions shown, the drive mode of the angular rate sensor was computed by finite element model (FEM) analysis using a commonly available program; ANSYS version 5 as illustrated in FIG. 13. The results of the analysis illustrated that the frequency of the drive mode for the exemplary dimensions illustrated in FIGS. 15–16 to be 9739 hertz while the sense mode was about 4237 Hz.

As discussed above, the inner beams 24 and 28 are mechanically interconnected with the outer beams 22 and 26 by way of the interconnecting elements 30 and 32 near the midpoints of the beams. Because of this arrangement, both the inner beams 24 and 28 and the outer beams 22 and 26 experience the Coriolis force equally. Since the concept does not depend upon amplification of the Coriolis force in the inner sense beams 24 and 28, the design of the angular rate sensor 20 and the non-gimballed mounting structure may be optimized to maximize the sense signal in the inner sense beams 24 and 28 without substantial regard to the corresponding sense frequency. As such, a beam that is substantially thinner than wider in dimension tends to maximize the strain and corresponding voltage signal of the inner sense beams 24 and 28. Thus, the beams are formed with a generally rectangular cross section such as shown in FIGS. 5 and 6 such that the thickness (i.e. surfaces 68 and 70) is relatively smaller than the width (i.e. surfaces 60 and 62). As such, a thickness of 0.005 inches may be selected to maximize both the rate output signal and be practical from a state of the art of the etched quartz fabrication techniques. With such a configuration, the output signal for a 5 picofarad capacitor in the sense buffer circuit 150 will provide a signal to angular rate input ratio of approximately $2.5\mu$ volts/deg/hr. Correspondingly, a gimballed device with the same overall length and a bandwidth of 100–200 hertz will provide an angular input rate of $0.5$–$0.75\mu$ volt/deg/hr, depending on the exact value of bandwidth. The bandwidth of the angular rate sensor in accordance with the present invention is not limited by the sense mode since it is located approximately 5000 Hz (i.e., 4237 Hz) away as determined by the FEM analysis discussed above. The sense mode is also the lowest resonant frequency of the device; therefore, performance will not be limited by environmental inputs over the typical 0–2000 hertz range of extraneous vibration and shock profiles. Alternate designs are also possible where the sense frequency is designed to be closer to the drive frequency to provide amplification although limiting the bandwidth somewhat.

Figure 2:
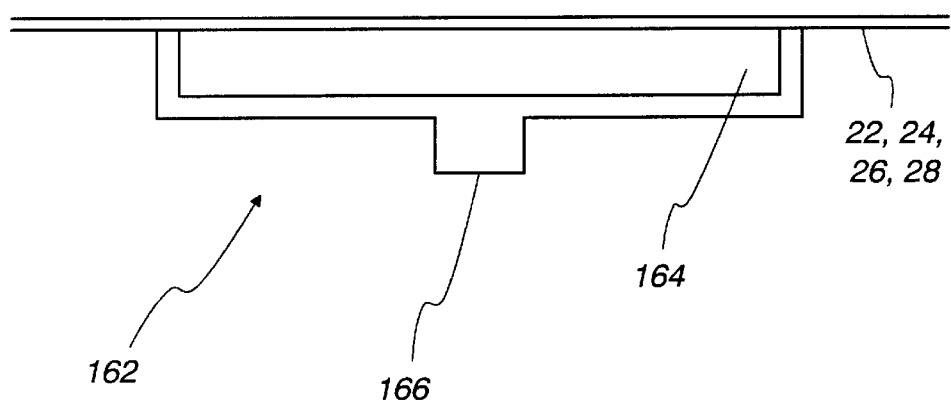
FIG. 2 is a side elevational view of the mounting structure for the angular rate sensor illustrated in FIG. 1.

In accordance with the present invention, the angular rate sensor 20 is mounted by way of a non-gimballed mounting structure as illustrated in FIG. 2 and generally identified with the reference numeral 162. The mounting structure 162 is a single axis mounting structure and includes a generally U-shaped mounting block 164, preferably made from the same material as the vibrating beams 22, 24, 26 and 28, for example, crystalline quartz. The substrate 21 is generally centered relative to the mounting block 164 and rigidly secured thereto, for example, with an adhesive, such as epoxy.

The mounting structure 162 also includes a mounting leg 166 disposed on a bottom surface of the mounting block 164. The mounting leg 166 is used to provide a mounting interface with the device whose angular rate is to be sensed. The mounting leg 166 also minimizes mounting stresses on the sensor 20. More particularly, the mounting leg 166 has a relatively smaller surface area than the generally U-shaped mounting block 164. Since the mounting leg 166 will normally be rigidly secured to the device whose angular rate is to be monitored or to a fixture by way of an epoxy, mounting stresses due to the mismatch of thermal coefficients of expansion of the epoxy relative to the sensor 20 will be minimized due to the relatively small surface area of the mounting leg 166 relative to the mounting block 164.

Obviously, many modifications and variations of the present invention are possible in light of the above teachings. Thus, it is to be understood that, within the scope of the appended claims, the invention may be practiced otherwise than as specifically described above.

- 20 -

APPENDIX

As discovered during tine testing, the tine frequency depends on the drive level. This effect can be explained by the tine going into tension and increasing the effective spring rate. This is a derivation of this effect based on some approximations to what happens in a clamped - clamped beam. The first thing is to define the beam parameters in terms of length, displacement and thickness in the direction of motion.

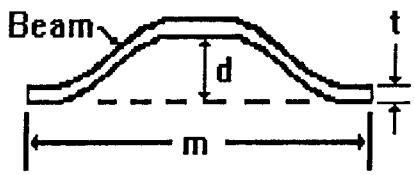

Figure 1. Displaced Beam (Exaggerated)

Where:  t - Thickness in direction of motion
m - Beam active length
d - Displacement This analysis assumes the tine bends like an s-bending beam, with one end translating straight up. Let h = m/2 where h represents half of the active beam length. Then the spring rate, $K_s$, can be determined as follows:

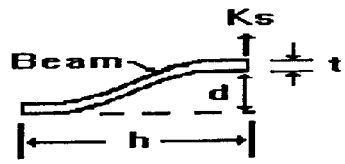

$$K_s = \frac{E*b*t^3}{h^3}$$

Figure 2. S-Bending Beam

Where,  E = Young's Modulous    $1.68 * 10^{12}$ dynes/cm$^2$
b = Breath of tine (epi thickness)    20 μm
t = Thickness in motion direction    17 μm
h = Half beam length    1117.6/2 = 558.8 μm

- 21 -

The actual beam displacement calculated using Timoshenko[1], has an inflection point at 22.416% from each clamped end instead of 25% as would be expected by a pure cosine shaped beam deflection. This is because the beam mass is distributed along its length and tends to inflect closer to the clamped ends. The ratio is 22.416/25 = 0.8966 so the half beam length is shorten by this factor. Since $K_s$ has $h^3$ in the denominator, the spring rate increases by a factor of 1.387.

The axial spring rate is:

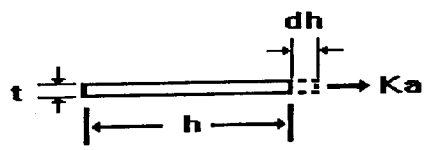

$$K_a = \frac{E*b*t}{h}$$

Figure 3. Axial Spring Rate

The tensional increase in the beam is due to the increase in beam length as the amplitude increases. The free end of a s-bending beam follows an arc. This arc is the same as though a rigid rod of .8333 times the length of the beam was pivoting at a point 17% of the way from the clamped end. In the case of a clamped-clamped beam, this free arc changes to a straight line. Thus the beam stretches to accommodate the motion. This is the source of the frequency shift due to increased drive amplitude. For the clamped-clamped beam the equivalent radius is .7472 times the length of the beam.

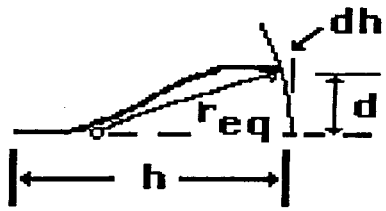

Figure 4. S-Bending Equivalent Radius

---

[1] *Vibration Problems in Engineering*, by S. Timeshenko; D. Van Nostrand Co., Inc., New York, New York, Copyright 1937, page 343.

- 22 -

The equivalent radius for the clamped-clamped case is:

$$r_{eq} = 0.8333 * h * 0.8966 = 0.7472 * h$$

where the 0.8333 is the equivalent radius factor and the 0.8966 is the clamped-clamped inflection point shortening effect. From Figure 4 above, the stretch in beam length can be computed.

$$dh = r_{eq} * (1 - \cos(\beta))$$

Where $\beta$ is the angle of $r_{eq}$ with respect to the original position. In this case it is:

$$\beta = \arcsin(d/r_{eq}) \approx d/r_{eq}$$

Since normal beam displacements are 1% to 2% of the beam thickness and the beams are 30 to 100 times as long as they are thick this is a very good approximation. Substituting for $\beta$ into the expression for dh gives:

$$dh = r_{eq} * [1 - \{1 - \tfrac{1}{2}(d^2/r_{eq}^2)\}] = d^2/2 * r_{eq}$$

Knowing the change in beam length allows the magnitude of the tension to be calculated as $T = K_a * dh$. The tension increase translates into an increase in the s-bending spring rate. The tension conversion is as follows:

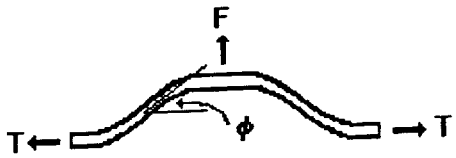

Figure 5. Tension to Bend Force $F = T * \sin(\emptyset)$ and for a cosine the maximum angle, $\emptyset$, is $\pi/2 *$ peak/baseline angle. In this case, the angle $\emptyset$ is: $\pi/2 * d/(\tfrac{1}{2}*h*.9)$. Since the angles are small the net result is: $F = T * \pi/2 * 2*d/(h*.9)$ and to get spring rate

- 23 - divide by the displacement d. This gives the equivalent nonlinearity $$K_{nl} = T * \pi/(h*.9)$$

Since the spring is nonlinear, the average value needs to be used in determining the frequency shift. Even though the peak value is high, most of the cycle is much lower than a linear spring. By integrating over the cycle, an average rate can be used. For adding to the Ks the ratio is:

$$\int_0^1 x^2 \, dx = 0.3333 \quad \int_0^1 x \, dx = 0.5 \quad Ratio = \frac{.3333}{.5} = 0.6666$$

The shift in the natural frequency can now be calculated. This is nothing more than the change in average spring rate.

$$f_n = f_o * \sqrt{\frac{K_a + \frac{2}{3} * K_{nl}}{K_a}} \qquad f_n = f_o * \sqrt{1 + \frac{2}{3} * \frac{K_{nl}}{K_a}}$$

Substituting in for $K_a$ and $K_{nl}$ gives:

$$K_{nl} = T * \frac{\pi}{h} * 1.1 \qquad K_{nl} = K_a * dh * \frac{\pi}{h} * 1.1 \qquad K_{nl} = \frac{E*b*t}{h} * dh * \frac{\pi}{h} * 1.1$$

$$K_{nl} := \frac{E*b*t}{h} * (\frac{d^2}{2*r_{eq}}) * \frac{\pi}{h} * 1.1 \qquad K_{nl} := \frac{E*b*t}{h} * (\frac{d^2}{2*.7472*h}) * \frac{\pi}{h} *$$

For Ka gives:

$$K_a = \frac{E*b*t^3}{(.8966*h)^3} \qquad K_a = \frac{E*b*t^3}{(h)^3} * 1.387$$

Combining gives:

- 24 -

$$f := \sqrt{1 + \frac{\frac{E*b*t*d^2*\pi}{1.4943*h^3} * \frac{2}{3} * 1.1}{\frac{E*b*t^3}{h^3} * 1.387}} \qquad f := \sqrt{1 + \frac{d^2}{t^2} * 2.14}$$

*RNH 5-19-95*

This is the equation for the frequency shift for various displacements, d, of the tine with respect to the thickness, t, in the direction of motion. Plotting this compared with test data on the beam drive gives:

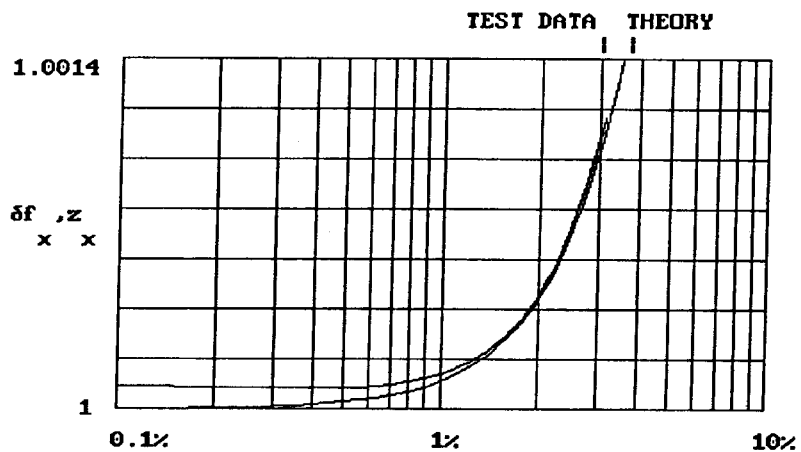

Figure 6. Test Data and Theory Frequency Shift with Drive Amplitude

Figure 6 shows good correlation of the beam drive tine with the derived equation.

What is claimed and desired to be secured by Letters Patent of the United States is:

1. An angular rate sensor for providing a signal representative of angular motion relative to a predetermined axis, the angular sensor comprising:
   a predetermined plurality of vibrating beams formed from a predetermined substrate, said vibrating beams spaced apart and connected together at opposing ends;
   means for exciting said vibrating beams to cause said beams to vibrate in the plane of the substrate,
   means for sensing the vibration frequency of one or more of said vibrating beams and providing an output signal representative of the angular rate relative to said predetermined axis; and
   means for electrically compensating for bias errors in said output signal resulting from any geometric mismatch of said beams, said electrically compensating means including
      first and second electrodes disposed on opposing surfaces of said vibrating beams,
      a first signal having a first polarity applied to said first electrode, and
      a second signal having a polarity opposite said first signal applied to said second electrode.

2. An angular rate sensor as recited in claim 1, wherein said predetermined plurality of vibrating beams is four.

3. An angular rate sensor as recited in claim 1, wherein said predetermined substrate is formed from a predetermined piezoelectric material.

4. An angular rate sensor as recited in claim 3, wherein said predetermined piezoelectric material is quartz.

5. An angular rate sensor as recited in claim 1, wherein said predetermined substrate is formed from a predetermined silicon material.

6. An angular rate sensor as recited in claim 1, wherein said electrically compensating means includes twisting means for causing one or more of said vibrating beams to twist relative to the longitudinal axis of the beams.

7. An angular rate sensor for providing a signal representative of angular motion relative to a predetermined axis, the angular sensor comprising:
   predetermined plurality of vibrating beams formed from a predetermined substrate, said vibrating beams spaced apart and connected together at opposing ends;
   means for exciting said vibrating beams to cause said beams to vibrate in the plane of the substrate;
   means for sensing the vibration frequency of one or more of said vibrating beams and providing an output signal representative of the angular rate relative to said predetermined axis; and
   means for applying an electrical signal to at least one of said vibrating beams to electrically compensate for bias errors in said output signal resulting from any geometric mismatch of the beams;
   wherein said electrically compensating means includes twisting means for causing one or more of said vibrating beams to twist relative to the longitudinal axis of the beams; and
   wherein said twisting means includes means for generating opposing electrical fields on opposing sides of said one or more beams, said generating means being disposed between one or both ends of said one or more beams and predetermined nodal points on said beams.

8. An angular rate sensor as recited in claim 7, wherein said predetermined nodal points are the points of inflection of said beams when said beams are in an excited state.

9. An angular rate sensor as recited in claim 7, wherein said twisting means further includes a plurality of electrodes to enable said opposing electrical fields to be generated between the ends of said one or more beams and said nodal points on opposing sides of said one or more beams.

10. An angular rate sensor as recited in claim 9, wherein the polarity of said opposing electrical fields is generally parallel to the longitudinal axis of the beams.

11. An angular rate sensor as recited in claim 9, wherein the polarity of said opposing electrical fields is generally normal to the longitudinal axis of the beams.

12. An angular rate sensor for providing a signal representative of angular motion relative to a predetermined axis, the angular rate sensor comprising:
   a first, a second, a third, and a fourth vibrating beams, generally parallel, spaced apart and connected together at opposing ends, formed from a predetermined substrate, defining, a pair of inner beams and a pair of outer beams;
   means for exciting said inner pair of beams and said outer pair of beams;
   means for sensing the vibration frequency and providing an output signal representative of the angular rate relative to said predetermined axis;
   means for electrically compensating said sensor for any bias errors in the output signal resulting from any geometric mismatch of said beams, said electrically compensating means including
      first and second electrodes disposed on opposing surfaces of said vibrating beams,
      a first signal having a first polarity applied to said first electrode, and
      a second signal having a polarity opposite said first signal applied to said second electrode.

13. An angular rate sensor as recited in claim 12, wherein said predetermined substrate is formed from a crystalline material.

14. An angular rate sensor as recited in claim 12, further including means for interconnecting said inner beams and said outer beams such that each outer beam is interconnected with an inner beam.

15. An angular rate sensor as recited in claim 14, wherein said exciting means includes means for exciting one or the other of said inner pair of vibrating beams or said outer pair of vibrating beams.

16. An angular rate sensor as recited in claim 14, wherein said sensing means includes means for sensing one or the other of said inner pair of vibrating beams or said outer pair of vibrating beams.

17. An angular rate sensor as recited in claim 12, wherein said electrically compensating means includes twisting means for causing one or more of said vibrating beams to twist relative to their longitudinal axis.

18. An angular rate sensor for providing a signal representative of angular motion relative to a predetermined axis, the annular rate sensor comprising:
   a first, a second, a third, and a fourth vibrating beams, generally parallel, spaced apart and connected together at opposing ends, formed from a predetermined substrate, defining a pair of inner beams and a pair of outer beams;
   means for exciting said inner pair of beams and said outer pair of beams;
   means for sensing the vibration frequency and providing an output signal representative of the angular rate relative to said predetermined axis;

means for applying an electrical signal to at least said first beam to electrically compensate said sensor for any bias errors in the output signal resulting from any geometric mismatch of the beams;

wherein said electrically compensating means includes twisting means for causing one or more of said vibrating beams to twist relative to their longitudinal axis;

wherein said twisting means includes means for generating opposing electrical fields on opposing sides of at least said first beam, said generating means being disposed between one or both ends of at least said first beam and predetermined nodal points of said first beam; and wherein said twisting means further includes a plurality of electrodes to enable said opposing electrical fields to be generated between the ends of at least said first beam and said nodal points on opposing sides of said first beam.

19. An angular rate sensor as recited in claim 18, wherein the polarity of said opposing electrical fields is generally parallel to the longitudinal axis of the beams.

20. An angular rate sensor as recited in claim 18, wherein the polarity of said opposing electrical fields is generally normal to the longitudinal axis of the beams.

21. An angular rate sensor for providing a signal representative of angular motion relative to a predetermined axis, the angular sensor comprising:

a plurality of beams comprising first and a second vibrating beams formed from a substrate, said vibrating beams spaced apart and connected together at opposing ends;

means for exciting said first and said second vibrating beams to cause said beams to vibrate in the plane of the substrate;

means for sensing the vibration frequency of one or more of said vibrating beams and providing an output signal representative of the angular rate relative to said predetermined axis; and means, coupled to said means for exciting, for electrically compensating for bias errors in said output signal resulting from any geometric mismatch of the beams wherein said means for electrically compensating includes:

a first drive circuit operating at a first substantially constant drive amplitude for exciting said first vibrating beam to cause said first vibrating beam to vibrate in the plane of said substrate at a first drive frequency;

a second drive circuit operating at a second substantially constant drive amplitude for exciting said second vibrating beam to cause said second vibrating beam to vibrate in the plane of said substrate at a second drive frequency substantially identical to said first drive frequency; and an electrode pattern disposed over the plurality of beams and configured to enable an electric field to cause at least one of the beams of the plurality of beams to twist about its longitudinal axis.

22. An angular rate sensor providing a signal representative of angular motion relative to a predetermined axis, the angular rate sensor comprising at least a first and a second vibrating beam formed from a substrate, said vibrating beams spaced apart and connected together at opposing ends;

means for exciting said first and said second vibrating beams to cause said beams to vibrate in the plane of the substrate;

means for sensing the vibration frequency of one or more of said vibrating beams and providing an output signal representative of the angular rate relative to said predetermined axis; and a circuit coupled to at least said first vibrating beam for generating opposing electric fields on opposing surfaces of said vibrating beam to compensate for bias errors in said output signal resulting from any geometric mismatch of the beams.

* * * * *